June 30, 1942.   A. L. PARKER   2,287,900
PRIMING VALVE ASSEMBLY
Filed March 17, 1941   2 Sheets—Sheet 1

INVENTOR
A. L. Parker
Mason & Porter
ATTORNEYS

June 30, 1942. A. L. PARKER 2,287,900
PRIMING VALVE ASSEMBLY
Filed March 17, 1941 2 Sheets-Sheet 2
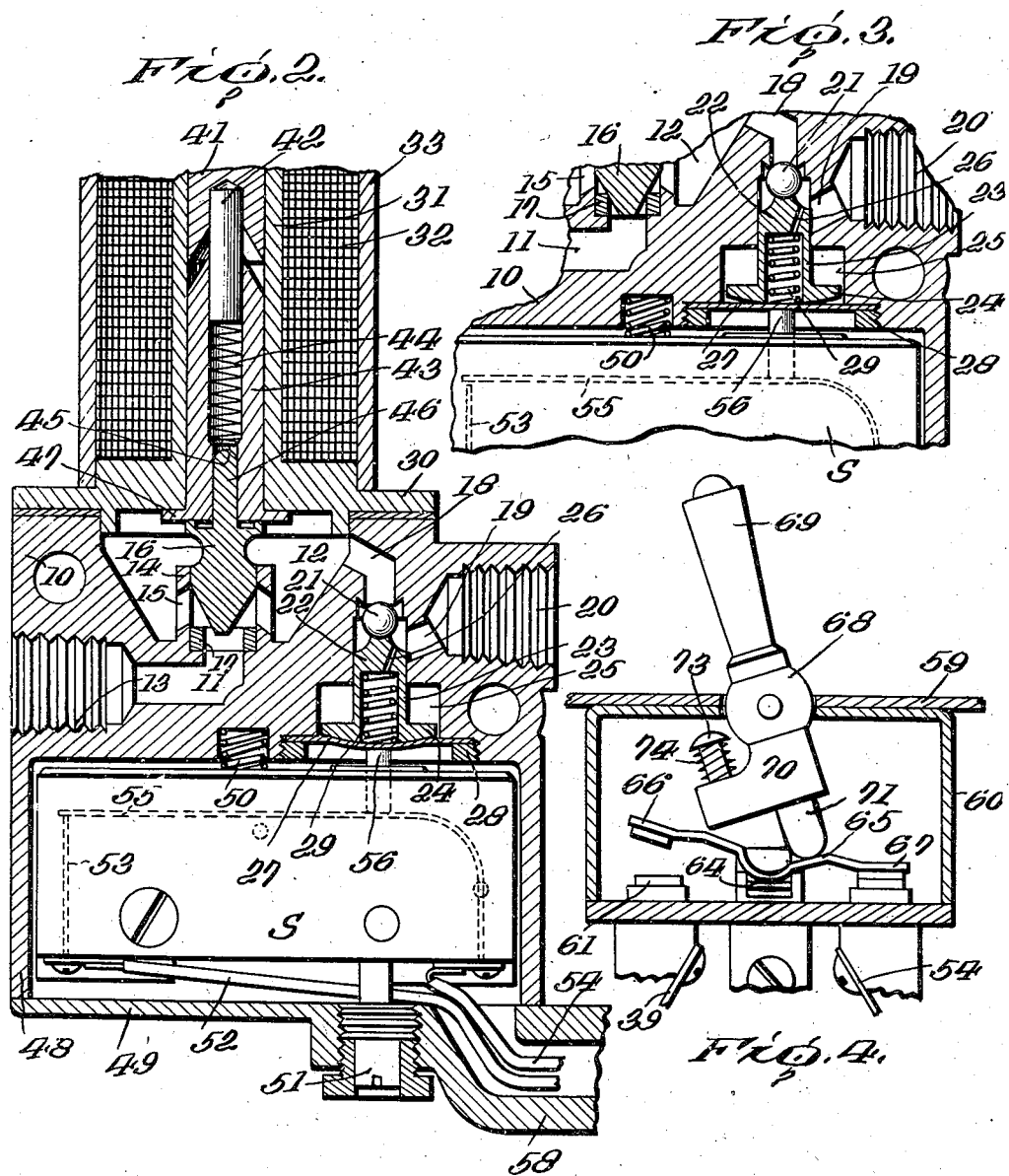
INVENTOR
Arthur L. Parker
By Mason & Porter
ATTORNEYS Patented June 30, 1942

2,287,900

UNITED STATES PATENT OFFICE 2,287,900

PRIMING VALVE ASSEMBLY

Arthur L. Parker, Cleveland, Ohio

Application March 17, 1941, Serial No. 383,828

17 Claims. (Cl. 123—187.5)

The present invention relates to new and useful improvements in a valve assembly, and more particularly to improvements in a valve mechanism which may be conveniently employed as a priming valve to control the admission of priming fuel to internal combustion engines.

In various types of internal combustion engines, it is necessary or desirable to prime the engine in order to facilitate starting thereof and even after the engine is initially started but before it is successfully warmed up, it is often desirable to deliver additional priming fuel during "sputtering" of the engine. The present invention is concerned with the provision of a valve mechanism which is adapted for use as a priming valve to control the passage of fuel to the engine under these circumstances and the priming fuel may be forced to the engine by a hand or power pump or the like. In particular, the valve assembly of the present invention is adapted for use with aircraft engines where it is desirable to maintain the priming valve at a point between the supply tank and the engine where a minimum amount of piping need be employed so as to keep the pressure drop in the line down to a minimum. This usually necessitates the mounting of the valve assembly at some point remote from the instrument panel or other location which is easily accessible to the pilot so that it is necessary to control the valve by some remote control mechanism. For illustrating the present invention, the valve assembly is electrically operated by means of a solenoid and independent circuits are employed for energizing the solenoid under different conditions. A suitable form of manual switch may be mounted on the instrument panel for selectively closing one or another of the solenoid circuits. When the solenoid is energized, the valve is adapted to be opened for permitting the passage of priming fuel to the engine and when the solenoid is deenergized, the valve is automatically returned to a closed or seated position.

An object of the present invention is to provide a valve assembly which is adapted to permit the passage of priming fuel to the engine but wherein the valve member is automatically closed upon initial starting of the engine.

Another object of the invention is to provide a valve assembly of the above type wherein the valve member may be momentarily opened after initial starting of the engine in order to admit additional priming fuel before the engine is warmed up.

A further object of the invention is to provide a priming valve assembly of the above type wherein the suction pull of the engine upon initial starting serves to automatically close the valve member and thus close the priming line.

A still further object of the invention is to provide a priming valve assembly of the above type wherein one of the solenoid circuits includes a highly sensitive switch mechanism which is responsive to the suction pull of the engine for automatically breaking the circuit and permitting closing of the priming line.

A still further object of the invention is to provide a priming valve assembly of the above type wherein an independent solenoid circuit may be momentarily closed for opening the valve member so as to admit additional priming fuel to the engine after it has started.

The above and other objects of the invention will in part be obvious and will be hereinafter more fully pointed out.

In the accompanying drawings:

Figure 2 is a similar fragmentary sectional view showing the position of the parts of the valve assembly during initial priming of the engine.

Figure 3 is a fragmentary detail section showing the position of the control diaphragm after the engine has started.

Figure 4 is a detail view showing the position of the control switch upon initial starting of the engine.

Figure 1:
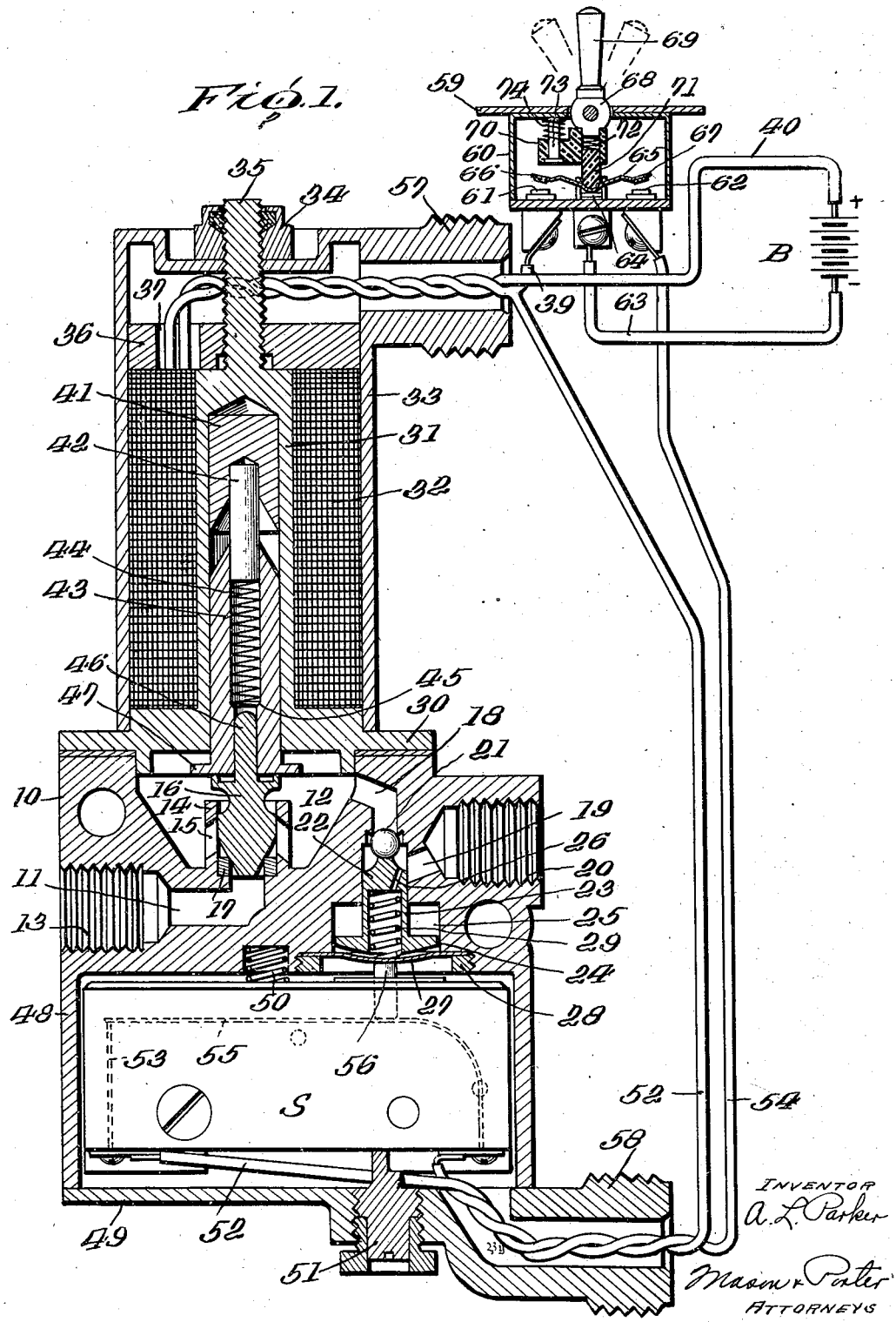
Figure 1 is a longitudinal vertical section showing the valve assembly in an inoperative position before the engine is started.

Referring more in detail to the accompanying drawings, there is provided a valve casing 10 having an inlet port 11 which leads to an internal chamber 12. The inlet port 11 is illustrated as being provided with a threaded portion 13 which is adapted to be connected to a fuel supply conduit. Within the chamber 12, the valve casing is provided with an upstanding sleeve portion 14 which is provided with lateral openings 15 therethrough. A main valve member 16 is reciprocable within the sleeve portion 14 which serves as a guide therefor. This main valve member 16 is adapted to cooperate with a valve seat 17 around the inner end of the inlet port 11. A passage 18 leads from the chamber 12 and affords communication with an outlet port 19 which is illustrated as having a threaded portion 20 adapted to be connected to a fuel conduit which leads to the cylinder priming jets.

A ball check valve 21 is adapted to control communication between the passage 18 and the outlet port 19 and is disposed at the end of a plunger 22 which is provided with a depending cylindrical sleeve portion 23 and with an outward flange portion 24. The flange portion 24 is reciprocable in a recess 25 and is guided by the outer walls thereof. A relatively small aperture 26 through the plunger 22 affords communication between the outlet port 19 and the space within the cylindrical sleeve portion 23 of the plunger. A diaphragm 27 closes the bottom end of the recess 25 and is secured to the valve casing by an annular nut 28. A coil spring 29 is disposed within the sleeve portion 23 of the plunger and has one end thereof bearing against the plunger and has the opposite end thereof bearing against the diaphragm 27 so as to normally tend to force apart the plunger and the diaphragm.

The chamber 12 in the valve casing 10 is closed by a cover plate 30 which is provided with an upstanding central sleeve portion 31 around which the solenoid windings 32 are disposed. An upper housing 33 encloses the solenoid and is secured to the valve casing 10 by engagement between a nut 34 and a threaded extension 35 on the sleeve portion 31. A top closure 36 also threadedly engages the extension 35 and is adapted to seal the adjacent end of the solenoid. This closure is provided with an opening 37 through which the wires 39, 40 extend to the solenoid windings. Within the sleeve 31, there is provided a block member 41 into which one end of a pin 42 extends. The opposite end of the pin 42 extends into a central recess in the solenoid core 43 which acts as a plunger and extends into the chamber 12. A space is provided between the block 41 and the plunger 43 so as to permit limited reciprocating movement thereof and a coil spring 44 is disposed within the plunger and has one end thereof bearing against a shoulder 45 on the plunger with the opposite end thereof bearing against the pin 42. Thus, the spring 44 normally tends to force the plunger into the chamber 12. The main valve member is provided with a projection 46 which extends into the plunger 43 and may be rigidly secured thereto or merely guided therein. Outward movement of the plunger 43 is limited by engagement between a flange 47 and the inner surface of the cover 30.

The opposite end of the valve casing 10 is provided with a wall portion 48 which is closed by a plate 49. There is thus provided an internal chamber within which a highly sensitive switch mechanism S is disposed. This switch mechanism may be of the conventional microswitch type which is more or less diagrammatically illustrated. In order to properly locate the switch mechanism S within the chamber, a spring 50 disposed within a recess in the valve casing bears against the switch box and an adjusting screw 51 is mounted in the plate 49 and bears against the opposite face of the switch box. A wire 52 leads to one of the switch terminals 53 and a wire 54 leads to the other switch terminal 55 which is in the form of a spring arm normally urged away from the contact 53 and against a button 56 which, in turn, is adapted to contact with the adjacent surface of the diaphragm 27. The wire 52 is connected to the wire 39 from the solenoid. The casing 33 and the plate 49 are provided with adapter portions 57, 58, respectively, to which conduits for the wires may be attached.

The valve assembly is located at a suitable point between the source of supply and the engine and is controlled by a switch mechanism which is preferably mounted on the instrument panel 59 within easy access to the operator. The switch mechanism includes a casing 60 within which switch contacts 61, 62 are mounted. The wire 39 from the solenoid is connected to the switch contact 61 and the wire 54 from the microswitch S is connected to the other switch contact 62. The other wire 40 from the solenoid is connected to one terminal of a battery B or other source of electric current, and a wire 63 leads from the other battery terminal to a central switch contact 64 which includes a lever 65 disposed within the switch casing 60. The lever 65 may be shifted so that the end 66 thereof will engage the switch contact 61 or so that the end 67 will engage the switch contact 62. Selective movement of the switch lever 65 is controlled by a pivotally mounted lever 68 having an outwardly extending handle portion 69. The lever 68 carries an insulating block 70 within the switch casing 60 and includes a non-conducting portion 71 which is pressed by a spring 72 against the central portion of the lever 65 when the switch is in a neutral or intermediate position. The block 70 carries a shiftable pin 73, one end of which is forced outwardly by a spring 74 toward the instrument panel and against the inner surface of the switch casing.

Before any effort is made to start the engine, the various parts of the valve assembly will assume the positions shown in Figure 1. The manual control switch 69 is thus in an intermediate or neutral position holding the switch arms 66, 67 out of engagement with the contacts 61, 62. The valve members 16, 21 are seated and the diaphragm 27 is depressed by the spring 29 below the flange 24 on the plunger 22 so that the button 56 forces the microswitch arm 55 into engagement with the switch contact 53. However, the battery circuit is open so that no current flows. In order to initially start the engine, the manual switch is shifted to the position shown in Figure 4 which results in shifting the lever 65 so that the arm 67 is in engagement with the switch contact 62. The control switch is adapted to remain in this position by reason of the substantially right angle contact between the lever 65 and the member 71 until manually shifted by the operator. In this position of the switch, the battery circuit is closed and the circuit completed through the solenoid and through the microswitch. Thus, in tracing the circuit, from switch contacts 62, 64 current passes along the wire 54, through the contacts 53, 55 of the microswitch, along the wire 52 to the wire 39, then through the solenoid windings, then through the wire 40 leading to the battery B, and then through the wire 63 to the contact 64. The solenoid is thus energized and this will result in upward movement of the solenoid core or bushing 43 against the action of the spring 44. The main valve member 16 may then be forced away from the seat 17 by the pressure of the fuel in the inlet port 11 and this fuel will pass through the chamber 12 and into the passage 18. The pressure of the fuel will then shift the ball valve 21 and the plunger 22 against the action of the spring 29 so as to permit the fuel to pass into the outlet port 19 which leads to the cylinder priming jets. During this passage of the fuel, the flange 24 of the plunger 22 will be forced into engagement with the depressed diaphragm 27, as shown in Figure 2.

As soon as the engine initially starts, a suction pull will be created in the line leading from the outlet port 19 and this suction pull will tend to create a vacuum within the recess defined by the sleeve portion 23 of the plunger 22. Since the opposite side of the diaphragm 27 is open to atmospheric pressure through the electrical conduit 58, the diaphragm will be shifted to the position shown in Figure 3, thus compressing the spring 29 and elevating the plunger 22 so as to seat the check valve 21. This results in permitting the microswitch arm 55 to disengage the contact 53 so as to break the solenoid circuit and permit the main valve member 16 to be seated under the action of the spring 44. In this manner, after initial starting of the motor, the priming fuel line will be automatically closed. The operator may then return the manual switch arm 69 to the neutral position shown in Figure 1.

After initial starting of the engine, it may be desirable to admit additional fuel through the priming line while the engine is warming up. Since the microswitch contacts are opened during suction pull on the outlet line 19, it is impossible to close the solenoid circuit which includes the microswitch. For the purpose of directing additional fuel to the cylinder priming jets after starting of the engine, a separate solenoid circuit may be closed for energizing the solenoid independently of the microswitch circuit. Thus, the operator may shift the manual control lever 69 to a position opposite from that of Figure 4, so as to cause the arm 66 to engage the switch contact 61. In this position of the switch lever 65, the battery circuit is completed through the solenoid windings by the wires 39, 40 and 63. In shifting the switch handle 69 to this position, the pin 73 engages the inner surface of the switch casing 60 and is shifted so as to compress the spring 74. As soon as the operator relieves holding pressure on the switch handle 69, the spring 74 will force the lever 68 to return to a neutral position, thus breaking the solenoid circuit. By this arrangement, a momentary priming of the engine after initial starting thereof can be effected.

From the foregoing description, it will be seen that the present invention provides a valve assembly which is particularly adapted for use in controlling the admission of priming fuel to the cylinder priming jets of an internal combustion engine. The valve assembly may be conveniently located between the source of fuel supply and the engine and may be controlled from a remote point, such as the instrument panel of an airplane or the like. In the illustrated embodiment of the invention, the main valve member is normally spring closed to prevent passage of fuel through the priming system and this main valve member may be opened by means of a solenoid. The remote control switch on the instrument panel is constructed and arranged so as to selectively close one or another solenoid circuit. For initially starting the engine, the remote control switch is positioned so as to effect energization of the solenoid by closing a circuit which includes a highly sensitive microswitch. A diaphragm is in communication with the supply line to the engine and is associated with an auxiliary check valve. This diaphragm is responsive to the suction pull of the engine on starting and serves to break the microswitch contacts so as to break the primary circuit and de-energize the solenoid. The main valve member is then closed to prevent further passage of priming fuel. The remote control switch may be returned to a neutral position and then shifted to another position after the engine has started. This second position of the control switch serves to close a secondary circuit which includes only the solenoid windings. Thus, after the engine has started but before it is sufficiently warmed up, it may be desirable to admit additional priming fuel and for this purpose, the remote control switch can be shifted to its second position for energizing the solenoid and opening the main valve member. This second position of the control switch is a momentary position, that is, a position wherein the control switch is urged toward a neutral position by spring means as soon as pressure on the switch lever is released. During initial starting of the engine, however, the control switch will remain in its first position by substantially right angled engagement between the switch handle and the switch contact lever.

While one form of the invention has been shown for purposes of illustration, it is to be clearly understood that various changes in the details of construction and arrangement of parts may be made without departing from the scope of the invention as set forth in the appended claims.

I claim:

1. A valve assembly for controlling the passage of priming fuel to an internal combustion engine, comprising a valve casing through which the fuel passes, a normally closed valve shiftable between open and closed positions for controlling the passage of fuel through said valve casing, means operable to hold said valve in an open position prior to starting of the engine in order to permit continued flow of fuel to the engine, and means responsive to starting of the engine for effecting release of the valve holding means on initial starting of the engine to permit simultaneous closing of the valve.

2. A valve assembly for controlling the passage of priming fuel to an internal combustion engine, comprising a valve casing through which the fuel passes, a normally closed valve shiftable between open and closed positions for controlling the passage of fuel through said valve casing, means including a solenoid adapted to be energized for holding said valve in an open position prior to starting of the engine in order to permit continued flow of fuel to the engine, and means responsive to starting of the engine for breaking the solenoid circuit on initial starting of the engine whereby the solenoid is de-energized to permit automatic closing of the valve.

3. A valve assembly for controlling the passage of priming fuel to an internal combustion engine, comprising a valve casing through which the fuel passes, a normally closed valve shiftable between open and closed positions for controlling the passage of fuel through said valve casing, means for maintaining said valve in an open position prior to starting of the engine in order to permit continued flow of fuel to the engine, and means responsive to initial starting of the engine and operable independently of the temperature of the engine for releasing the valve and permitting simultaneous closing thereof.

4. A valve assembly for controlling the passage of priming fuel to an internal combustion engine, comprising a valve casing through which the fuel passes, a valve member for controlling the passage of fuel through said casing, spring means for normally closing said valve member, means for maintaining said valve member in an open position to permit continued flow of fuel to the engine, and means responsive to the suction created by the starting of the engine for permitting the automatic spring closing of said valve member.

5. A valve assembly for controlling the passage of priming fuel to an internal combustion engine, comprising a valve casing through which the fuel passes, a valve member for controlling the passage of fuel through said casing, spring means for normally closing said valve member, means for maintaining said valve member in an open position to permit continued flow of fuel to the engine, means responsive to the suction created by the starting of the engine for permitting the automatic spring closing of said valve member, and means independent of the suction responsive means for momentarily opening said valve member after starting of the engine whereby to admit additional fuel thereto.

6. A valve assembly for controlling the passage of priming fuel to an internal combustion engine, comprising a valve casing through which the fuel passes, a valve member for controlling the passage of fuel through said valve casing, means including a solenoid adapted to be energized for maintaining said valve member in an open position to permit continued flow of fuel to the engine, means operable upon initial starting of the engine to break the solenoid circuit whereby the solenoid is de-energized to permit automatic closing of the valve member, and means operable independently of the breaking of the solenoid circuit for momentarily opening said valve member whereby to admit additional fuel to the engine after starting thereof.

7. A valve assembly for controlling the passage of priming fuel to an internal combustion engine, comprising a valve casing through which the fuel passes, a valve member for controlling the passage of fuel through said valve casing, means including a solenoid adapted to be energized for maintaining said valve member in an open position to permit continued flow of fuel to the engine, means operable upon initial starting of the engine to break the solenoid circuit whereby the solenoid is de-energized to permit automatic closing of the valve member, and means including an independent circuit for momentarily energizing the solenoid whereby to open said valve member and admit additional fuel to the engine after starting thereof.

8. A valve assembly for controlling the passage of priming fuel to an internal combustion engine, comprising a valve casing through which the fuel passes, a valve member for controlling the passage of fuel through said valve casing, spring means for normally closing said valve member, means including a solenoid adapted to be energized for opening said valve member to permit flow of fuel to the engine, and means operable upon initial starting of the engine to break the solenoid circuit whereby to de-energize the solenoid and permit automatic spring closing of the valve member.

9. A valve assembly for controlling the passage of fuel to an internal combustion engine, comprising a valve casing through which the fuel passes, a normally closed valve member for controlling the passage of fuel through said valve casing, means including a solenoid adapted to be energized for opening and maintaining said valve member in an open position to permit continued flow of fuel to the engine, a switch mechanism included in the solenoid circuit, and means responsive to the suction pull of the engine on starting for opening said switch mechanism and breaking the solenoid circuit whereby the solenoid is de-energized to permit automatic closing of the valve member.

10. A valve assembly for controlling the passage of fuel to an internal combustion engine, comprising a valve casing through which the fuel passes, a normally closed valve member for controlling the passage of fuel through said valve casing, means including a solenoid adapted to be energized for opening and maintaining said valve member in an open position to permit continued flow of fuel to the engine, a switch mechanism included in the solenoid circuit, and diaphragm means shiftable in response to the suction pull of the engine on starting for opening said switch mechanism and breaking the solenoid circuit whereby the solenoid is de-energized to permit automatic closing of the valve member.

11. A valve assembly for controlling the passage of fuel to an internal combustion engine, comprising a valve casing through which the fuel passes, a normally closed valve member for controlling the passage of fuel through said valve casing, means including a solenoid adapted to be energized for opening and maintaining said valve member in an open position to permit continued flow of fuel to the engine, a switch mechanism included in the solenoid circuit, means operable upon initial starting of the engine for opening said switch mechanism whereby to break the solenoid circuit and permit automatic closing of said valve member, means providing an additional solenoid circuit independent of said switch mechanism, and means for momentarily closing said additional solenoid circuit to momentarily energize the solenoid whereby to open said valve member and admit additional fuel to the engine after starting thereof.

12. A valve assembly for controlling the passage of priming fuel to an internal combustion engine, comprising a valve casing having inlet and outlet ports through which the fuel passes, a normally closed main valve member for controlling the passage of fuel through said inlet port, an auxiliary valve controlling communication through said outlet port, means including a solenoid adapted to be energized for opening and maintaining said main valve member in an open position to permit continued flow of fuel to the engine, a switch mechanism included in the solenoid circuit, and means associated with said auxiliary valve and responsive to the suction pull of the engine on starting for opening said switch mechanism and breaking the solenoid circuit whereby to de-energize the solenoid and permit automatic closing of the main valve member.

13. A valve assembly for controlling the passage of priming fuel to an internal combustion engine, comprising a valve casing having inlet and outlet ports through which the fuel passes, a main valve member for controlling the passage of fuel through said inlet port, means for normally closing said main valve member, an auxiliary valve controlling communication through said outlet port, a solenoid assembly including a core member associated with said main valve member for opening and maintaining the said main valve member in an open position to permit continued flow of fuel to the engine, a highly sensitive switch mechanism included in the solenoid circuit, a diaphragm associated with said auxiliary valve and responsive to the suction pull of the engine on starting and adapted to force said auxiliary valve to a closed position, and means cooperating with said diaphragm and with said switch mechanism for opening the said switch mechanism and breaking the solenoid circuit after the engine has started whereby to de-energize the solenoid and permit automatic closing of the main valve member.

14. A valve assemby for controlling the passage of priming fuel to an internal combustion engine, comprising a valve casing through which the fuel passes, valve means for controlling the passage of fuel through said casing, solenoid means adapted to be energized for opening said valve means and maintaining the said valve means in an open position to permit continued flow of fuel to the engine, means including a highly sensitive switch mechanism for providing a circuit for the solenoid means, and means including a diaphragm responsive to the suction pull of the engine on starting for opening said switch mechanism to break the circuit of the solenoid means whereby to de-energize the solenoid means and permit automatic closing of the valve means.

15. A valve assembly for controlling the passage of priming fuel to an internal combustion engine, comprising a valve casing through which the fuel passes, valve means for controlling the passage of fuel through said casing, solenoid means adapted to be energized for opening said valve means and maintaining the said valve means in an open position to permit continued flow of fuel to the engine, means including a highly sensitive switch mechanism for providing a circuit for the solenoid means, means including a diaphragm responsive to the suction pull of the engine on starting for opening said switch mechanism to break the circuit of the solenoid means whereby to de-energize the solenoid means and permit automatic closing of the valve means, and means providing a secondary circuit for the solenoid means, said secondary circuit being independent of the circuit including the switch mechanism and adapted to be momentarily closed for energizing the solenoid after starting of the engine whereby to admit additional priming fuel thereto.

16. In a fuel priming system for internal combustion engines, valve means for controlling the passage of priming fuel to the engine, electrical means associated with said valve means for opening said valve means to permit flow of priming fuel to the engine, means providing a primary circuit for actuating said electrical means to initially start the engine and a secondary circuit for actuating said electrical means after the engine has started, said primary circuit including a highly sensitive switch mechanism, a remote control switch which is shiftable to selectively close one or the other of said circuits, and means responsive to the suction pull of the engine on starting for opening said sensitive switch mechanism to break the primary circuit and de-energize the solenoid whereby to permit closing of said valve means, and said remote control switch being shiftable to close the secondary circuit for admitting additional priming fuel to the engine after starting thereof.

17. In a fuel priming system for internal combustion engines, valve means for controlling the passage of priming fuel to the engine, electrical means associated with said valve means for opening said valve means to permit flow of priming fuel to the engine, means providing a primary circuit for actuating said electrical means to initially start the engine and a secondary circuit for actuating said electrical means after the engine has started, said primary circuit including a highly sensitive switch mechanism, a remote control switch which is shiftable to selectively close one or the other of said circuits, means responsive to the suction pull of the engine on starting for opening said sensitive switch mechanism to break the primary circuit and de-energize the solenoid whereby to permit closing of said valve means, and said remote control switch being shiftable to close the secondary circuit for admitting additional priming fuel to the engine after starting thereof, and means constantly tending to return said control switch from its position closing the secondary circuit to a neutral intermediate position.

ARTHUR L. PARKER.